Patented Apr. 8, 1952

2,592,365

UNITED STATES PATENT OFFICE 2,592,365

CONDENSATION PROCESS

Charles Weizmann, Rehovoth, Israel, assignor to Polymerisable Products Limited, London County, England, a British company No Drawing. Application January 12, 1949, Serial No. 70,590. In Great Britain March 2, 1944

11 Claims. (Cl. 260—668)

The present invention relates to an improved process for carrying out condensation reactions in organic chemistry.

The condensation reactions between hydrocarbon compounds containing reactive methylene groups or reactive methine groups ($CH_2$ or $CH$ respectively) with compounds with which condensation can take place with or without elimination of water, namely aldehydes and ketones, have heretofore usually been carried out with the help of metallic sodium, anhydrous sodium alcoholates (either in an excess of the corresponding alcohols or in inert solvents or without a solvent) or with the help of sodamide:

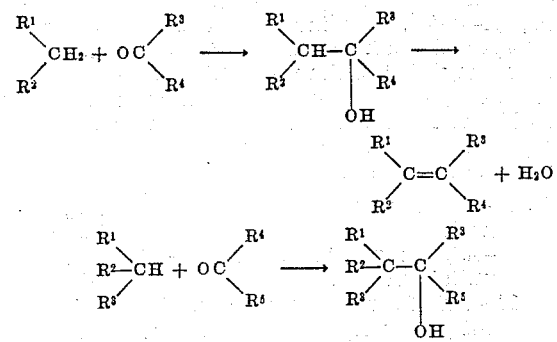

The expression "reactive methylene and methine groups" includes all those in which the hydrogen atom or atoms of the said CH group or $CH_2$ group are activated by the immediate vicinity of substituents containing double-bonds, such as olefinic double bonds, or aromatic nuclei or the like. Such hydrogen atoms are generally replaceable by alkali metals or the metals of the alkaline earth series. These substances react with ketones or aldehydes, splitting off water or forming alcohols.

Considering the above-mentioned usual methods, one disadvantage is that the catalysts (i. e. the free metals, alcoholates or amides) cannot be recovered as such, as normally the reaction product is isolated from the reaction mixture by treatment with water.

I have now found that all these reactions can be carried out easily and with satisfactory yields by the use of the system formed by combining potassium hydroxide and a substance containing two ether oxygen atoms separated by one or two carbon atoms, and in particular, a substance belonging to the class of acetals, ketals and dialkyl ethers of ethylene glycol. It may be assumed, although this is not essential, that a complex or molecular compound is formed. A preferred method for the preparation of such "complex" is described here, by way of example (the "parts" are by weight):

224 parts of potassium hydroxide, e. g. granules or lumps of powder, are added to 625 parts of acetaldehyde-dibutylacetal, which mixture is gradually heated, while stirring. At about 150° C., the potassium hydroxide reacts and the product liquefies and (if allowed to settle) the complex forms a separate bottom layer. When the mass, however, is cooled with thorough agitation, during the cooling step, the "complex" solidifies to a finely divided micro-crystalline powder, which is suspended in the excess of the acetal.

Lower boiling acetals also form such complexes but not quantitatively, as the liquefying step cannot be carried out under atmospheric pressure and, therefore, if working at atmospheric pressure, only the surface of the pieces of solid material is converted into the complex. It is possible to follow the above procedure with lower boiling acetals, if one works under elevated pressure; but this would represent a certain complication of the procedure and of the apparatus, and one can, therefore, in such cases, take an excess of potassium hydroxide over the theoretical amount required in the condensation reaction, and use preferably potassium hydroxide in the form of a powder.

The choice of the specific acetal to be applied in a given reaction mainly depends on the boiling points of both the starting materials and the final products; it is chosen so as to allow an easy separation of the solvent (e. g. the acetal) from the end-product and from any unchanged starting material.

In the following table, a number of such acetals are given, arranged according to their boiling points:

Acetals formed from:

| | °C. |
|---|---|
| Methyl ethyl ketone and glycol | 115 |
| Propionaldehyde and ethyl alcohol | 124 |
| Butyraldehyde and ethyl alcohol | 143 |
| Acetaldehyde and propyl alcohol | 143 |
| Butyraldehyde and isopropyl alcohol | 164 |
| 2-ethyl-hexanal and methyl alcohol | 165 |
| Acetaldehyde and isobutyl alcohol | 175 |
| Acetaldehyde and n-butyl alcohol | 186 |
| Butyraldehyde and butyl alcohol | 213 |

The condensation operation is very simple: one adds to the complex, prepared as above, the mixture of the starting materials to be condensed with each other, preferably at a temperature of 0° C., but higher temperatures are advisable in some cases. The reaction is usually lively and is accompanied by a distinct rise in temperature which is checked by external cooling. The reaction can be completed, if necessary, by heating at a suitable temperature. By subsequent addition of water (e. g. in the form of ice) the inorganic material is transferred into the aqueous phase (i. e. into aqueous KOH solution which contains substantially all of the KOH used in making the complex used), while the condensation product produced goes into the organic layer (e. g. the solution in the acetal, which latter separates, being insoluble in the aqueous solution). The organic layer is separately drawn off and is subjected to fractional distillation or to any other treatment, suitable for the isolation of the desired product. Sometimes, the latter part of the procedure can be modified by adding a dilute aqueous acid to the reaction product, instead of ice or water.

It is evident that in the case of a condensation in which water is to be liberated in the reaction between a substance containing the $CH_2$ group and an aldehyde or a ketone, and if the reaction product is treated with water, the aqueous phase contains the potassium hydroxide, originally used in the reaction. The same applies to condensation reactions in which the water is not eliminated but in which an hydroxyl group is formed by migration of one active hydrogen atom to the oxygen atom of the carbonyl group, e. g. in the case where only one such active hydrogen atom exists so that the second hydrogen atom required for the formation of water is not available. In all these cases the potassium hydroxide can be recovered by the usual means, e. g. by heating the solution in presence of organic liquids such as described in an article in "Industrial and Engineering Chemistry" 32, 154 (1940). The above mentioned disadvantages of the classical method of condensation reactions are thereby avoided; potassium hydroxide is comparatively easy to handle and it can, at least in a large number of cases, be recovered as such.

Amongst the hydrocarbons containing reactive methylene or methine groups, mention may be made of:

Cyclopentadiene, indene, fluorene and benzologs of the latter.

In the following examples, some typical condensations are described, but the method is obviously not limited to these examples. The parts are by weight.

EXAMPLES (a) *Condensation of indene with anisaldehyde*

16.5 g. powdered potassium hydroxide, containing 14 g. (0.25 mol.) pure KOH, were converted into the complex with 150 cc. acetaldehyde-dipropyl-acetal. A solution of 23.2 g. (0.2 mol.) indene, freshly distilled in vacuo, and 27.2 g. (0.2 mol.) anisaldehyde in 20 cc. of the acetal was added to the well-stirred suspension at 20°. The agitation was continued at 80° for 1 hour. The reaction mixture was then cooled, decomposed with ice water and immediately neutralized with dilute sulphuric acid. A brown precipitate, insoluble in both layers, was filtered off and combined with the solid residue, obtained from the solvent layer which was freed from the acetaldehyde dipropyl acetal and 2.5 g. unchanged indene (10.8% of the starting material) by vacuum distillation.

Successive recrystallization from isopropyl alcohol, ethyl acetate and ethyl alcohol gave yellowish crystals of M. P. 119°:3-anisylidene-indene: yield 37 g.=79.06% of the theoretical amount. The substance gave with concentrated sulphuric acid a green-brown color reaction.

(b) *Condensation of indene with benzophenone*

16.5 g. powdered potassium hydroxide, containing 14 g. (0.25 mol.) pure KOH, were converted into the complex with 120 cc. acetaldehyde-dipropyl-acetal. A solution of 11.6 g. (0.1 mol.) freshly distilled indene and 18.2 g. (0.1 mol.) benzophenone in 20 cc. of the acetal was added to the well-stirred suspension whereupon the agitation was continued at 85° for 1 hour. The reaction mixture was cooled, decomposed with ice water and immediately neutralized with dilute sulphuric acid. The clear solvent layer was submitted to fractional distillation in vacuo. After removal of the acetaldehyde dipropyl acetal, of 3.0 g. unchanged indene (25.8% of the initial amount) and 4.7. g. benzophenone (25.8% of the starting material) a darkish residue was obtained. It was purified by recrystallization from isopropyl alcohol and ethyl alcohol: Orange-yellow crystals of diphenyl-benzofulvene; M. P. 111°; yield, 17.5 g.=62.6%.

(c) *Condensation of indene with acetone*

16.5 g. powdered potassium hydroxide, containing 14 g. (0.25 mol.) pure KOH, were converted into the complex with 100 cc. acetaldehyde-dipropyl-acetal. A mixture of 23.2 g. (0.2 mol.) freshly distilled indene and 11.6 g. (0.2 mol.) acetone was added to the well-stirred suspension at room temperature. The agitation was continued at 60° for 1 hour. The reaction mixture was decomposed with ice water and dilute sulphuric acid. Fractional distillation gave:

At 53–55°/17 mm.—acetaldehyde - d i p r o p y l - acetal.

75–80°/17 mm.—indene, 3.5 g.=15.1% of the initial amount.

140–145°/17 mm.—upon redistillation B. P. 142°/16 mm. dimethyl-benzofulvene as golden yellow liquid.

Yield: 24.5 g.=78.5% of the theoretical amount.

(d) *Condensation of indene with 2-ethyl-hexanal*

10 g. powdered potassium hydroxide, containing 8.4 g. (0.15 mol.) pure KOH, were converted into the complex with 100 cc. acetaldehyde-dipropyl-acetal. A mixture of 11.6 g. (0.1 mol.) freshly distilled indene and 12.8 g. (0.1 mol.) 2-ethyl-hexanal was added to the well-stirred suspension at room temperature. The agitation was continued at 60° for 1 hour. The reaction mixture was decomposed with ice water and dilute sulphuric acid. Fractional distillation of the clear solution gave:

At 53–55°/17 mm.—acetaldehyde - d i p r o p y l - acetal.

75–80°/17 mm.—indene and 2-ethyl-hexanal.

140–145°/12 mm.—(2-ethyl - hexylidene) -indene as golden-yellow liquid.

Yield: 15.0 g.=66.4% of the theoretical amount.

Found: C, 89.8; H, 9.7; ml. wt. 235.

Calc. for $C_{17}H_{12}$: C, 90.2; H, 9.8; ml. wt. 226.

It will be noted that the reactive methylene or methine group ($CH_2$ or CH) can be generically expressed as CH$_x$, in which $x$ is a positive whole number not greater than 2, to avoid alternative expressions. In such CH or CH$_2$ group, in the above hydrocarbons, the carbon atom itself of said group does not participate in a double bond, but the hydrogen atom or atoms become activated by said carbon atom being directly connected to at least one other carbon atom which latter participates in a double bond. Hence the hydrocarbons used in the present invention contain the grouping CH$_x$—C=C. It is understood that the above-mentioned hydrocarbons are mentioned only by way of examples, without limiting the scope of the invention thereto.

The subject matter of the present case is in major part continued from my copending application Ser. No. 591,857, filed May 3, 1945 (now U. S. Patent 2,474,175), of which case the present application is a continuation-in-part.

The term "hydrocarbon" in this application and in the claims thereof is intended to cover a compound consisting entirely of the elements carbon and hydrogen, including the specific hydrocarbons cyclopentadiene, indene, fluorene and benzologs of the latter. The term "hydrocarbon" does not include compounds containing oxygen, nitrogen or halogen elements.

I claim:

1. A process of carrying out a condensation reaction between (a) a hydrocarbon containing a reactive CH$_x$ group in which $x$ is a positive whole number not greater than 2, the carbon atom of said group being directly bonded to the carbon atom carrying the double bond, and the carbon atom of said CH$_x$ group not itself being a carbon atom of a double bond, and (b) a substance which is a member of the group consisting of aldehydes and ketones which substance contains no unsaturated aliphatic group, on the other hand, which process includes the feature that the reagent used for promoting the condensation is the solid very finely divided system obtained by the interaction of potassium hydroxide and an organic substance containing two ether forming oxygen atoms, which two oxygen atoms are separated from each other by at least one and not more than two carbon atoms, such system being suspended in an excess of said organic substance.

2. A process of carrying out a condensation reaction between (a) a hydrocarbon substance selected from the group consisting of cyclopentadiene, indene and fluorene and benzologs of the latter on the one hand, and (b) a substance which is a member of the group consisting of aldehydes and ketones which substance contains no unsaturated aliphatic group, on the other hand, which process includes the feature that the reagent used for promoting the condensation is the solid very finely divided system obtained by the interaction of potassium hydroxide and an organic substance containing two ether forming oxygen atoms, which two oxygen atoms are separated from each other by at least one and not more than two carbon atoms, such system being suspended in an excess of said organic substance.

3. A process of carrying out a condensation reaction between (a) indene on the one hand, and (b) a substance which is a member of the group consisting of aldehydes and ketones which substance contains no unsaturated aliphatic group, on the other hand, which process includes the feature that the reagent used for promoting the condensation is the solid very finely divided system obtained by the interaction of potassium hydroxide and an organic substance containing two ether forming oxygen atoms, which two oxygen atoms are separated from each other by at least one and not more than two carbon atoms, such system being suspended in an excess of said organic substance.

4. A process of carrying out a condensation reaction between (a) cyclopentadiene on the one hand, and (b) a substance which is a member of the group consisting of aldehydes and ketones which substance contains no unsaturated aliphatic group, on the other hand, which process includes the feature that the reagent used for promoting the condensation is the solid very finely divided system obtained by the interaction of potassium hydroxide and an organic substance containing two ether forming oxygen atoms, which two oxygen atoms are separated from each other by at least one and not more than two carbon atoms, such system being suspended in an excess of said organic substance.

5. A process of carrying out a condensation reaction between (a) fluorene on the one hand, and (b) a substance which is a member of the group consisting of aldehydes and ketones which substance contains no unsaturated aliphatic group, on the other hand, which process includes the feature that the reagent used for promoting the condensation is the solid very finely divided system obtained by the interaction of potassium hydroxide and an organic substance containing two ether forming oxygen atoms, which two oxygen atoms are separated from each other by at least one and not more than two carbon atoms, such system being suspended in an excess of said organic substance.

6. A process of carrying out a condensation reaction between (a) a benzolog of fluorene on the one hand, and (b) a substance which is a member of the group consisting of aldehydes and ketones which substance contains no unsaturated aliphatic group, on the other hand, which process includes the feature that the reagent used for promoting the condensation is the solid very finely divided system obtained by the interaction of potassium hydroxide and an organic substance containing two ether forming oxygen atoms, which two oxygen atoms are separated from each other by at least one and not more than two carbon atoms, such system being suspended in an excess of said organic substance.

7. A process of carrying out a condensation reaction between (a) a hydrocarbon substance selected from the group consisting of cyclopentadiene, indene and fluorene and benzologs of the latter on the one hand, and (b) a substance which is a member of the group consisting of aldehydes and ketones on the other hand, which process includes the feature that the reagent used for promoting the condensation is the solid very finely divided system obtained by the interaction of potassium hydroxide and an organic substance containing two ether forming oxygen atoms, which two oxygen atoms are separated from each other by at least one and not more than two carbon atoms, such system being suspended in an excess of said organic substance.

8. A process of carrying out a condensation reaction between (a) indene on the one hand, and (b) a substance which is a member of the group consisting of aldehydes and ketones on the other hand, which process includes the feature that the reagent used for promoting the condensation is the solid very finely divided system obtained by the interaction of potassium hydroxide and an organic substance containing two ether forming oxygen atoms, which two oxygen atoms are separated from each other by at least one and not more than two carbon atoms, such system being suspended in an excess of said organic substance.

9. A process of carrying out a condensation reaction between (a) cyclopentadiene on the one hand, and (b) a substance which is a member of the group consisting of aldehydes and ketones on the other hand, which process includes the feature that the reagent used for promoting the condensation is the solid very finely divided system obtained by the interaction of potassium hydroxide and an organic substance containing two ether forming oxygen atoms, which two oxygen atoms are separated from each other by at least one and not more than two carbon atoms, such system being suspended in an excess of said organic substance.

10. A process of carrying out a condensation reaction between (a) fluorene on the one hand, and (b) a substance which is a member of the group consisting of aldehydes and ketones on the other hand, which process includes the feature that the reagent used for promoting the condensation is the solid very finely divided system obtained by the interaction of potassium hydroxide and an organic substance containing two ether foming oxygen atoms, which two oxygen atoms are separated from each other by at least one and not more than two carbon atoms, such system being suspended in an excess of said organic substance.

11. A process of carrying out a condensation reaction between (a) a benzolog of fluorene on the one hand, and (b) a substance which is a member of the group consisting of aldehydes and ketones on the other hand, which process includes the feature that the reagent used for promoting the condensation is the solid very finely divided system obtained by the interaction of potassium hydroxide and an organic substance containing two ether forming oxygen atoms, which two oxygen atoms are separated from each other by at least one and not more than two carbon atoms, such system being suspended in an excess of said organic substance.

CHARLES CHAIM WEIZMANN.

REFERENCES CITED

The following references are of record in the file of this patent:

UNITED STATES PATENTS

| Number | Name | Date |
|---|---|---|
| 2,472,135 | Weizmann | June 7, 1949 |